(12) United States Patent
Björgvinsdóttir et al.

(10) Patent No.: US 12,363,257 B2
(45) Date of Patent: Jul. 15, 2025

(54) POSTPROCESSING PRIORITIZATION

(71) Applicant: Axis AB, Lund (SE)

(72) Inventors: Hanna Björgvinsdóttir, Lund (SE); Markus Skans, Lund (SE); Amanda Tydén, Lund (SE)

(73) Assignee: AXIS AB, Lund (SE)

( * ) Notice: Subject to any disclaimer, the term of this patent is extended or adjusted under 35 U.S.C. 154(b) by 73 days.

(21) Appl. No.: 18/186,239

(22) Filed: Mar. 20, 2023

(65) Prior Publication Data

US 2023/0344961 A1    Oct. 26, 2023

(51) Int. Cl.
*H04N 5/77* (2006.01)
*H04N 5/91* (2006.01)
*H04N 7/18* (2006.01)
*H04N 23/80* (2023.01)

(52) U.S. Cl.
CPC ........... *H04N 5/91* (2013.01); *H04N 5/77* (2013.01); *H04N 7/181* (2013.01); *H04N 23/80* (2023.01)

(58) Field of Classification Search
CPC ............ H04N 5/91; H04N 5/77; H04N 7/181; H04N 23/80; H04N 5/76; G08B 13/19608; G08B 13/19645; G08B 13/19669
See application file for complete search history.

(56) References Cited

U.S. PATENT DOCUMENTS

| | | | |
|---|---|---|---|
| 11,295,589 B2* | 4/2022 | Cho | H04N 23/60 |
| 2015/0015717 A1 | 1/2015 | Dong et al. | |
| 2016/0034766 A1 | 2/2016 | Bobbitt et al. | |
| 2016/0050396 A1* | 2/2016 | Gali | H04N 7/181 348/159 |
| 2016/0277664 A1* | 9/2016 | Mangold | H04N 5/2226 |
| 2020/0336659 A1 | 10/2020 | Cho et al. | |

FOREIGN PATENT DOCUMENTS

| | | |
|---|---|---|
| EP | 3511862 A1 | 7/2019 |
| GB | 2553569 A | 3/2018 |
| WO | 2014/42516 A1 | 3/2014 |

OTHER PUBLICATIONS

Extended European Search Report dated Sep. 9, 2022 for European Patent Application No. 22168948.2.

* cited by examiner

*Primary Examiner* — Ahmed A Berhan
(74) *Attorney, Agent, or Firm* — Volpe Koenig (57) ABSTRACT

A method for prioritization of video processing resources in a video processing and/or management system is provided. The method includes receiving video streams from multiple cameras and automatically ranking each camera as either a higher-priority or lower-priority camera. For higher-priority cameras, video content analysis is performed (as background processes), and the result is stored in storage. For lower-priority cameras, no such analysis is performed. The ranking is based on at least one of a historical usability, a historical cost, and a historical usability-to-cost ratio of a camera. A corresponding camera monitoring system, video processing and/or management system, computer program and computer program product are also provided.

12 Claims, 3 Drawing Sheets

POSTPROCESSING PRIORITIZATION

FIELD OF INVENTION

The present disclosure relates to the field of video (processing and/or) management systems (VMSs). In particular, the present disclosure relates to a prioritization of multiple incoming video streams when a VMS has limited video processing resources available for processing such multiple incoming video streams.

BACKGROUND

As part of e.g., a monitoring camera system, a video management system (VMS) is responsible for collecting video streams from multiple cameras and storing these video streams in storage. The VMS often also implements one or more user interfaces through which users may retrieve the stored video streams (either live, or from storage), and/or through which the users may e.g., post search queries in order to find particular objects and/or events of interests captured in the various video streams.

A camera often has the possibility to perform general processing and video content analysis of its video stream, including e.g., to detect certain events occurring in a scene depicted in the video stream, certain movements (tracks) of objects in the scene, and/or other motion in the scene and similar. The VMS may then perform additional processing and video content analysis which is not possible (or at least not desirable) to perform in the respective camera, including for example such analysis which requires more video processing resources (i.e., computational resources) than are available in each camera. For example, a camera may manage to detect the movement (track) of a particular object, and the VMS may be configured to further detect e.g., what color, size, or additional features the particular object has. The results of the additional processing and video content analysis may then be stored in a database, and the VMS may use these results when processing incoming search queries from the user. As one of many examples, the user may e.g., be interested in finding all video streams which have captured a blue vehicle driving, and the video content analysis performed by the VMS may be used to identify which video streams that contain such blue vehicles.

Even though the video processing resources of the VMS are usually greater than those of the individual cameras, the VMS may still not be capable of processing and analyzing more than a limited number of incoming video streams simultaneously. If receiving video streams from many video cameras, prioritizing how to process and analyze the incoming video streams may therefore become an issue. Known solutions include to simply decide in advance that such additional processing and analysis is to be performed only for video streams received from certain cameras, while video streams received from other cameras are instead transferred directly to storage without any such additional processing and analysis being performed by the VMS.

Although such a known solution may reduce the computational loading of the VMS, the amount of video processing resources needed to process and analyze a video stream is not constant but depends on the richness of the video stream in terms of e.g., interesting events and/or features captured by the video stream. Thus, even if reducing the number of cameras from which video streams are to be processed and analyzed may reduce some of the computational loading of the VMS, the video processing resources of the VMS may still not be sufficient in case the there are multiple video streams which happen to simultaneously be content-rich.

SUMMARY

To at least partially overcome the above-mentioned issues, the present disclosure provides an improved method for prioritization of video processing resources in a video processing and/or management system, a video processing and/or management system, a camera monitoring system, and a computer program and computer program product as defined by the accompanying independent claims. Various embodiments of the improved method, video processing and/or management system, camera monitoring system, and computer program and computer program product are defined in the accompanying dependent claims.

According to a first aspect, there is provided a method for prioritization of video processing resources in a video processing and/or management system. The method includes receiving two or more video streams captured by two or more cameras, including receiving at least a first video stream captured by a first camera. The method includes ranking each of the two or more cameras as either a higher-priority camera or a lower-priority camera. If ranking the first camera as a higher-priority camera, the method proceeds by performing video content analysis of the first video stream and storing a result of the performed video content analysis in storage. If ranking the first camera as a lower-priority camera, the method instead proceeds by storing the first video stream (directly) in storage without first, or in connection therewith, performing such video content analysis. In particular, in the envisaged method, the ranking of a camera includes one of: i) obtaining an indication of a historical usability of video content captured by the camera, and ranking the camera as a higher-priority camera if the historical usability exceeds a usability threshold and otherwise as a lower-priority camera; ii) obtaining an indication of a historical cost in terms of processing resources needed for performing video content analysis of video content captured by the camera, and ranking the camera as a higher-priority camera if the historical cost is below a cost threshold and otherwise as a lower-priority camera, and iii) ranking the camera as a higher-priority camera if the historical usability outweighs the historical cost of the camera and otherwise as a lower-priority camera.

As used herein, the "storage" used to store a video stream from a higher-priority camera may not necessarily be a same storage used to store a video stream from a lower-priority camera, or not even a same storage used to store a result of a video content analysis performed for a video stream from a higher-priority camera. For example, if ranking a camera as a higher-priority camera, the result of the video content analysis may be stored in one storage within the video processing and/or management system, while the video stream from this camera is stored somewhere else (e.g., in the higher-priority camera). In other embodiments, both the result of the video content analysis and the video stream may be stored in a same storage. Likewise, the video stream of a lower-priority camera may e.g., be stored in the lower-priority camera itself, or in a separate storage in the video processing and/or management system, or even in a same storage as used to store the video stream of a higher-priority camera, or similar. The important thing is that the video streams and results are stored somewhere, such that they can be retrieved by the video processing and/or management at a later time, e.g., when responding to a search query from a user as will be described in more detail later herein.

The envisaged method improves upon currently available technology and solutions in that it enables a ranking of cameras based on their statistical likelihood of being useful, their statistical likelihood of being easier to process, and/or a combination of both. As will be described later herein in more detail, a camera may be considered to have a higher usability if it has been involved in capturing many objects and/or events of interest earlier, and by processing and analyzing the video stream from such a camera as soon as it is received by the video processing and/or management system, the results of such an analysis can be made available more quickly for e.g., handling a search query from a user, without first having to process and analyze the video stream first when the search query arrives. This provides an improved use of the limited video processing resources, such that the risk of otherwise spending these resources on video streams which most likely will not be relevant for any user search is reduced or eliminated. Likewise, the envisaged method may help to spend resources on cameras which have a lower cost in terms of processing, e.g., on cameras which generate video streams which are easier to process than other cameras (e.g., video streams containing fewer object tracks). This may help to make available the video processing resources for as many cameras as possible, which may also facilitate the handling of the search query from the user by having results from as many cameras as possible already available when the search query arrives. Finally, by combining both the usability and cost of a camera, the envisaged method provides a good compromise/tradeoff between usability and cost which may further help to prioritize the limited video processing resources. In summary, and phrased differently, the envisaged method enhances the probability that when a search query from a user later arrives, the results of video content analyses of one or more video streams which will turn out to be most relevant for the search are already available and stored in storage.

In some embodiments of the method, the historical usability of a camera may include a number or frequency of incident reports generated based on the video content captured by the camera. An incident report may for example be generated by a user observing the incident on screen while watching video content captured by the camera (via e.g., the VMS), and/or e.g., by software and/or hardware configured to automatically detect such incidents. An incident may for example be a burglary, an assault, a fire, a trespassing, an accident, or any other incident which is deemed interesting enough to report. Each such incident may be registered in e.g., a database, and a number (or frequency) of incidents may then be obtained by querying such a database. It is envisaged that if a number (or frequency) of such incidents are high (i.e., above a certain threshold), it may be deduced that the camera is located in an area where things of interest are more likely to occur. This may thus be reflected in the proposed historical usability of the camera as defined above.

In some embodiments of the method, the historical cost of a camera may include a number or frequency of object tracks based on video content captured by the camera. As will be described in more detail herein, tracking of objects may be performed e.g., by using one or more object tracking algorithms, sometimes in combination with e.g., one or more object detection algorithms. It is envisaged that if a camera is located in an area wherein the number (or frequency) of tracked objects is high (i.e., above a certain threshold), it may be deduced that video content analysis of a video stream from such a camera is likely to be more costly in terms of computational/video processing resources compared to video streams from cameras not located in such areas. This may thus be reflected in the proposed historical cost of the camera.

In some embodiments, the number or frequency of object tracks based on video content captured by a camera may be obtained from the camera, especially if object tracking is included in the processing and video content analysis of a video stream performed by the camera itself. In other embodiments, the object tracking may be included in the further processing and video content analysis performed by the system (e.g., the VMS), and the number (or frequency) of such tracked objects may then be received from the system itself instead of from the camera.

In some embodiments of the method, the video content analysis may include one or more of object detection, key-point detection, object classification, object re-identification, segmentation, and object tracking. It is of course envisaged that the video content analysis may include also other types of analyses which may be useful for e.g., a user searching for particular events and/or objects among all recorded video streams from all cameras.

In some embodiments of the method, the video content analysis may be performed as a background process in the video processing and/or management system. Here, a "background process" means that the system may have other running processes which have higher priority, such as e.g., real-time decoding/encoding of the incoming video streams, transferring to storage, handling communication with users, or similar. By performing the video content analysis in the background, it may be made sure that the analysis does not interfere (as much) with such other processes.

In some embodiments of the method, the receiving of two or more video streams captured by two or more cameras may further include receiving a second video stream captured by a second camera. The ranking of a camera may then include one or more of: using a historical usability of video content captured by the second camera as the usability threshold, or at least to define the usability threshold; using a historical cost in terms of processing resources needed for performing video content analysis of video content captured by the second camera as the cost threshold, or at least to define the cost threshold; and using how much the historical usability of the second camera outweighs the historical cost of the second camera to define the particular amount with which the historical usability of the first camera needs to outweigh the historical cost of the first camera for the first camera to be ranked as a higher-priority camera. Thus, the various thresholds are not fixed, but instead changed dynamically depending on properties of (locations of) one or more other cameras providing video streams to the system.

In some embodiments of the method, the usability threshold, the cost threshold and/or the certain amount which the historical usability needs to outweigh the historical cost is/are dynamically updated based on a current amount of video processing resources available for video content analysis in the video processing and/or management system. This may help the method to better adapt to changing resource demands, and to maximize the number of video streams being processed directly before storage, which may in turn help to further optimize the time needed for a user to obtain a hit when searching for a particular type of video stream (segment), as more video content analysis has then already been performed before the user's search query arrives.

In some embodiments of the method, the method may further include receiving a search request from a user relating to a particular object and/or event of interest. The method may include determining whether there are one or more results of video content analyses performed on one or more video streams from one or more cameras already stored in storage, and whether any of these results indicate the particular object and/or event of interest. For example, in response to determining that a result of a performed video content analysis of the first video stream is stored in storage and indicates the particular object and/or event of interest, the method may proceed by delivering (after e.g., retrieval from storage) at least a part of the first video stream relevant for the object and/or event of interest to the user. The search query of the user may therefore be handled quicker as some results may already be available in storage, as the envisaged ranking of cameras improves the likelihood of cameras which are likely to have captured the object and/or object of interest already having been ranked as higher-priority cameras and their video streams already having been analyzed. In other embodiments, if there is no indication of the object and/or event of interest found in any results stored in storage, the method may proceed by first retrieving one or more video streams from storage from one or more cameras having been ranked as lower-priority cameras. Then, the method may include performing the video content analysis of these one or more video streams "on-demand" (i.e., upon receiving the search query), checking whether the result(s) of these "on-demand" analyses indicates the object and/or event of interest, and (if affirmative) deliver at least the relevant parts of these video streams from lower-priority cameras to the user.

In some embodiments of the method, the first video stream may be received directly from the first camera (i.e., without first being temporarily stored in storage). In some other embodiments of the method, the first video stream may first be stored in storage, and then retrieved from storage in order to perform the video content analysis on the first video stream. The first video stream may also e.g., be stored in a temporary buffer somewhere in between the first camera and the system, if e.g., various properties of the communication path between the system and first camera so requires.

In some embodiments of the method, the method may include "activating" the categorization of cameras into higher- and lower-priority cameras when it is determined that an available amount of video processing resources for video content analysis becomes (or risks becoming) sufficiently low, and e.g., goes below a resource threshold. Likewise, the method may include "deactivating" such categorization when it is determined that the available amount of video processing resources for video content analysis becomes (or appears becoming) sufficiently high for there not to be such a need, and e.g., exceeds (or equals) the resource threshold. Phrased differently, in some embodiments of the method, the method may further include performing the ranking of each of the two or more cameras in response to determining that an amount of video processing resources available for video content analysis in the video processing and/or management system is below a first resource threshold. In one or more embodiments of the method, in response to determining that the amount of video processing resources available for video content analysis in the video processing and/or management system exceeds (or equals) a second resource threshold (which may not necessarily equal the first resource threshold, if e.g., some hysteresis is desirable), the method may include instead treating all of the two or more cameras as if they were higher-priority cameras. In some embodiments of the method, such "activating" may e.g., be achieved by increasing the usability threshold and/or by decreasing the cost threshold if the amount of video processing resources available for video content analysis is determined to be below the first resource threshold, and/or by increasing the particular amount with which the historical usability must exceed the historical cost. Likewise, such "deactivating" may e.g., be achieved by decreasing the usability threshold and/or by increasing the cost threshold if the amount of video processing resources exceeds the second resource threshold, and/or by decreasing the particular amount with which the historical usability must exceed the historical cost. By changing the various thresholds and/or particular amounts as a function of the available video processing resources may help to better adapt to dynamic situations wherein e.g., the number of incoming video streams (and/or the individual richness of these video streams) changes over time.

According to a second aspect of the present disclosure, a video processing and/or management system is provided. The video processing and/or management system includes an interface for receiving two or more video streams captured by two or more cameras, including at least a first video stream captured by a first camera. The video processing and/or management system includes an interface for exchanging data with a storage. The video processing and/or management system includes a processor, and the video processing and/or management system further includes a memory storing instructions that, when executed by the processor, cause the video processing and/or management system to: receive the two or more video streams captured by the two or more cameras, including to receive at least a first video stream captured by a first camera; rank each of the two or more cameras as either a higher-priority camera or a lower-priority camera; if ranking the first camera as a higher-priority camera, perform video content analysis of the first video stream and to store a result of the performed video content analysis in storage, and if ranking the first camera as a lower-priority camera, store the first video stream in storage without first, or in connection therewith, performing such video content analysis. Ranking of a camera includes one of: i) to obtain an indication of a historical usability of video content captured by the camera, and to rank the camera as a higher-priority camera if the historical usability exceeds a usability threshold and otherwise as a lower-priority camera; ii) to obtain an indication of a historical cost in terms of processing resources needed for performing video content analysis of video content captured by the camera, and to rank the camera as a higher-priority camera if the historical cost is below a cost threshold and otherwise as a lower-priority camera, and iii) to rank the camera as a higher-priority camera if the historical usability outweighs the historical cost of the camera by more than a certain amount and otherwise as a lower-priority camera.

The video processing and/or management system according to the second aspect is thus configured to perform the corresponding steps of the method of the first aspect.

In some embodiments of the video processing and/or management system, the video processing and/or management system is further configured (i.e., the instructions are such that they when executed by the processor cause the device) to perform any of the embodiments of the method described herein.

According to a third aspect of the present disclosure, a monitoring camera system is provided. The monitoring camera system includes two or more cameras (e.g., at least a first and second video camera). The monitoring camera system includes a storage. The monitoring camera system further includes a video processing and/or management system according to the second aspect, i.e., a video processing and/or management system configured to perform the method of the first aspect, or any embodiment thereof as described herein.

According to a fourth aspect of the present disclosure, a computer program for prioritization of video processing resources (in a video processing and/or management system) is provided. The computer program is configured to cause, when executed by a processor of a video processing and/or management system (such as described herein with reference to the second aspect), cause this system to: receive two or more video streams captured by two or more cameras, including to receive at least a first video stream captured by a first camera; rank each of the two or more cameras as either a higher-priority camera or a lower-priority camera; if ranking the first camera as a higher-priority camera, perform video content analysis of the first video stream and to store a result of the performed video content analysis in storage, and if ranking the first camera as a lower-priority camera, store the first video stream in storage without first, or in connection therewith, performing such video content analysis. Ranking of a camera includes one of: i) to obtain an indication of a historical usability of video content captured by the camera, and to rank the camera as a higher-priority camera if the historical usability exceeds a usability threshold and otherwise as a lower-priority camera; ii) to obtain an indication of a historical cost in terms of processing resources needed for performing video content analysis of video content captured by the camera, and to rank the camera as a higher-priority camera if the historical cost is below a cost threshold and otherwise as a lower-priority camera, and iii) to rank the camera as a higher-priority camera if the historical usability outweighs the historical cost of the camera by more than a certain amount and otherwise as a lower-priority camera.

The computer program according to the fourth aspect is thus configured to cause the system to perform the method according to the first aspect.

In some embodiments of the computer program, the computer program is further configured to cause the system to perform any embodiment of the method of the first aspect as described herein.

According to a fifth aspect of the present disclosure, a computer program product is provided. The computer program product includes a computer readable storage medium storing a computer program according to the fourth aspect (or any embodiments thereof as described herein). The computer readable storage medium may for example be non-transitory, and be provided as e.g., a hard disk drive (HDD), solid state drive (SDD), USB flash drive, SD card, CD/DVD, and/or as any other storage medium capable of non-transitory storage of data.

Other objects and advantages of the present disclosure will be apparent from the following detailed description, the drawings, and the claims. Within the scope of the present disclosure, it is envisaged that all features and advantages described with reference to e.g., the method of the first aspect are relevant for, apply to, and may be used in combination with also any feature and advantage described with reference to the video processing and/or management system of the second aspect, the monitoring camera system of the third aspect, the computer program of the fourth aspect, and/or the computer program product of the fifth aspect, and vice versa.

BRIEF DESCRIPTION OF THE DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

A generic camera monitoring system will now be described in more detail with reference to FIG. 1A.

Figure 1A:
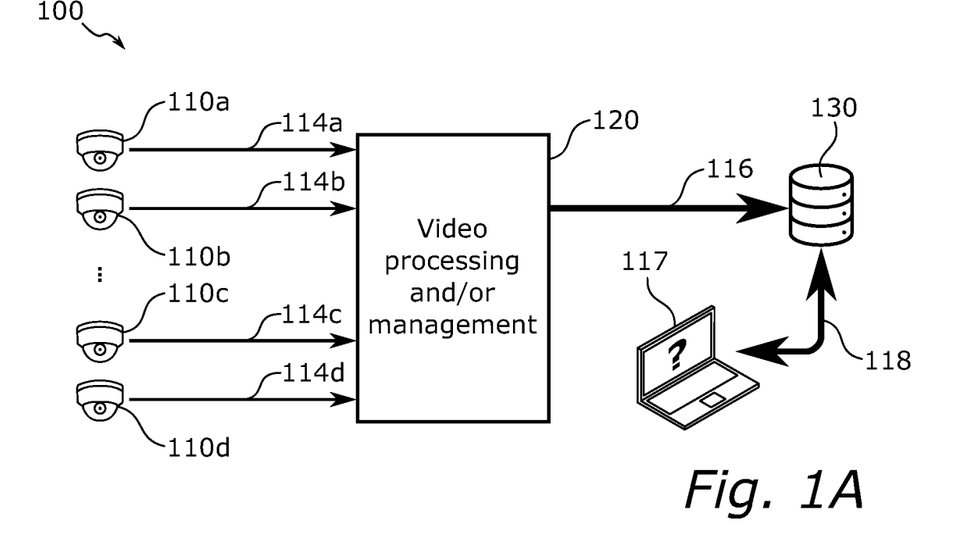
FIG. 1A schematically illustrates a generic camera monitoring system.

FIG. 1A schematically illustrates a camera monitoring system 100. The system 100 includes a plurality of (monitoring) cameras 110*a-d* that each captures a respective video stream 114*a-d*. The video streams 114*a-d* are provided to and received by a video processing and/or management system 120. In what follows, such a video processing and/or management system 120 will also be referred to as a "video management system", or simply a "VMS". One purpose of the VMS 120 is to make sure that the received video streams 114*a-d* from the cameras 110*a-d* are stored in storage 130, such that the video streams 114*a-d* may be accessed at a later time.

The need to retrieve one or more video streams from storage 130 at a later time often arises due to a suspicion that a certain object and/or event of (e.g., forensic) interest has been captured by one or more of the cameras 110*a-d*. Such an event of interest may for example be an accident, a break-in/burglary, an assault, a fire, or any other event for which there is a need to investigate what happened. Such an object of interest may e.g., include that a particular person, vehicle, or similar object has been recorded somewhere in the video stream, and/or that the particular object has been moving in a specific way in the scene captured in the video stream. Such movement may for example include entering or exiting a particular building, gate, or other area within the scene. It is thus desirable that the VMS 120 exposes an interface or API through which a user 117 can post search queries 118 including various search criteria, such that the user 117 does not need to retrieve and watch through all of the stored video streams in the storage 130 before being able to find the video stream(s) of interest. Such search criteria may for example include a particular time or time span, a particular camera, or similar at/by which the event of interest was supposedly captured.

However, it is often desirable that the search can be more specific than indicated above, especially if the user 117 is not sure of at exactly what time or time span, or by which particular camera, the event and/or object of interest was supposedly captured. For example, the user 117 may know that the object of interest is a person, and it may thus be desirable to search only for segments of the various video streams in the storage 130 which show persons. As another example, the user 117 may know that the object of interest is a vehicle having a particular color, and it may therefore be desirable to search only for segments depicting vehicles having the particular color. Yet another example may include the user 117 being interested in finding segments wherein e.g., a person exits or enters a particular door, and the search should then return only one or more segments of video streams capturing such events.

In order for such searching to be possible, video content analysis must first be performed on the video streams 114*a-d* captured by the cameras 110*a-d*, and the result(s) of such video content analysis must be made available to a searching algorithm configured to handle the various search requests (or queries) the user 117 may post. Examples of possible video content analysis include e.g., object detection and classification, motion tracking, object tracking, color analysis, key-point detection, re-identification, segmentation, and similar. The result of the video content analysis of each video stream 114*a-d* may be stored in storage together with e.g., the video streams 114*a-d* themselves, as illustrated by the arrow 116. The results of the video content analysis can then be searched through by the searching algorithm based on the search query 118 from the user 117, such that the searching algorithm may identify the video streams/video stream segments (if any) which correspond to the search query and return these (or e.g., some data pointing towards these) video streams/video stream segments to the user 117.

In the VMS 120, a finite amount of video processing resources is available for performing the video content analysis of the video streams 114*a-d*. Often, the video content analysis of video streams are performed as background processes running on the computational hardware of the VMS 120, as the VMS 120 may simultaneously be occupied also with more important things such as the very receipt, coding/decoding and saving of the video streams 114*a-d* themselves, or e.g., providing one or more live streams to the user 117. If the VMS 120 cannot manage to process and analyze all video streams at once, the VMS 120 may include a processing queue in which at least some of the video streams are placed if there are not currently enough video processing resources available in the VMS 120. However, if there are many cameras providing video streams to the VMS 120, such a queue may grow indefinitely, and in the end lead to e.g., an overloading of the VMS 120 and a partially or even fully reduced ability of the VMS 120 to perform its tasks.

Some offloading of the VMS 120 may be achieved by performing some of the video content analysis directly in the cameras 110*a-d*. Such tasks, suitable for being performed in a camera, may include e.g., object detection and/or object tracking, and the results of such camera-performed tasks may then be provided to the VMS 120 together with the video streams 114*a-d* (e.g., as metadata). By so doing, the VMS 120 may instead focus on other tasks which e.g., the cameras cannot (due to e.g., such tasks not being implemented in the cameras, or due to e.g., currently limited resources within the cameras) perform on their own. A camera may for example track a movement of an object in a scene captured by the camera, and indicate such a track to the VMS 120. The VMS 120 may then perform further processing and analysis of the corresponding video stream, e.g., in order to determine what color the tracked object has, or e.g., in order to perform one or more classifications of such a tracked object which the camera currently cannot, or is less suitable to, perform on its own. Such a result may be useful e.g., if the user 117 later wants to search for all objects which have moved along e.g., a same track, and which have a particular color. Herein, the processing performed by the cameras 110*a-d* may be referred to as "general processing", while the more specific processing performed by the VMS 120 may instead be referred to as "postprocessing", or even "background postprocessing".

Even if offloading some of the processing to the cameras, there is however still a risk that the video processing resources of the VMS 120 are still not sufficient for simultaneously postprocessing all video streams 114*a-d*. For example, if too many cameras simultaneously track objects, the VMS 120 may not be capable of e.g., analyzing what colors all of the tracked objects have, and the processing queue may grow too large.

A conventional and already available method for alleviating the above issues will now be described in more detail with reference also to FIG. 1B.

Figure 1B:
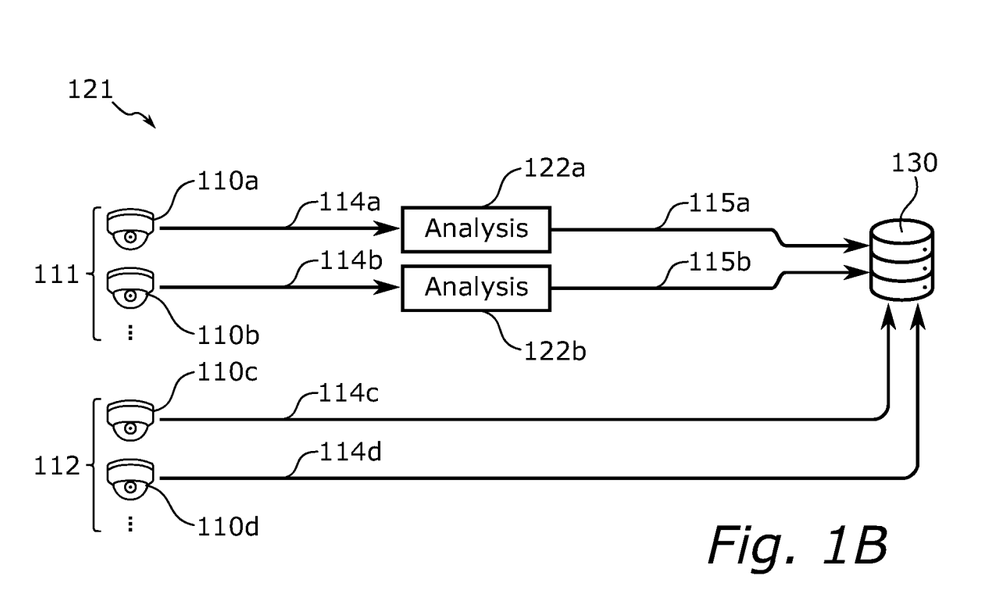
FIG. 1B shows a functional block diagram schematically illustrating a conventional method performed in a conventional video processing and/or management system of a camera monitoring system.

FIG. 1B shows a functional block diagram which schematically illustrates a method 121 performed in the VMS 120 in order to prioritize the limited video processing resources of the VMS 120. In the conventional method 121, the demand for video processing resources in the VMS 120 is reduced simply by manually deciding, in advance, to disable video content analysis (i.e., postprocessing) for video streams received from one or more particular cameras. In the example provided in FIG. 1B, it has been decided that video content analysis 122*a* and 122*b* is to be performed only for video streams 114*a* and 114*b* received from a first set 111 of cameras 110*a* and 110*b*. The results 115*a* and 115*b* of these video content analyses are then provided to storage 130. Even if not explicitly disclosed in FIG. 1B, the video streams 114*a* and 114*b* themselves may of course also be stored in storage 130 such that they may later be retrieved therefrom. For a second set 112 of cameras 110*c* and 110*d*, it has been decided in advance that video content analysis (i.e., postprocessing) is disabled and should not be performed (as e.g., a background process) in the VMS 120. Instead, the video streams 114*c* and 114*d* from these cameras 110*c* and 110*d* are sent directly to storage 130.

In order not to miss any event and/or object captured in the video streams 114*c* and 114*d* during a later search, video content analysis (not shown) is instead expected to be performed "on-demand" once (or if) a search query is posted by the user 117.

A problem with the method 121 shown in FIG. 1B is that it may be hard, or even impossible, to manually optimize the selection of for which cameras the postprocessing should be enabled, and for which cameras the postprocessing should be disabled, and there is e.g., an increased risk that video processing resources of the VMS 120 are still being spent on analyzing video streams which will turn out to be irrelevant for most incoming search queries.

In order to overcome such an issue, and as will now be described in more detail with reference to FIGS. 2A and 2B, the present disclosure proposes an improved method of how to prioritize the limited video processing resources of e.g., a VMS.

Figure 2A:
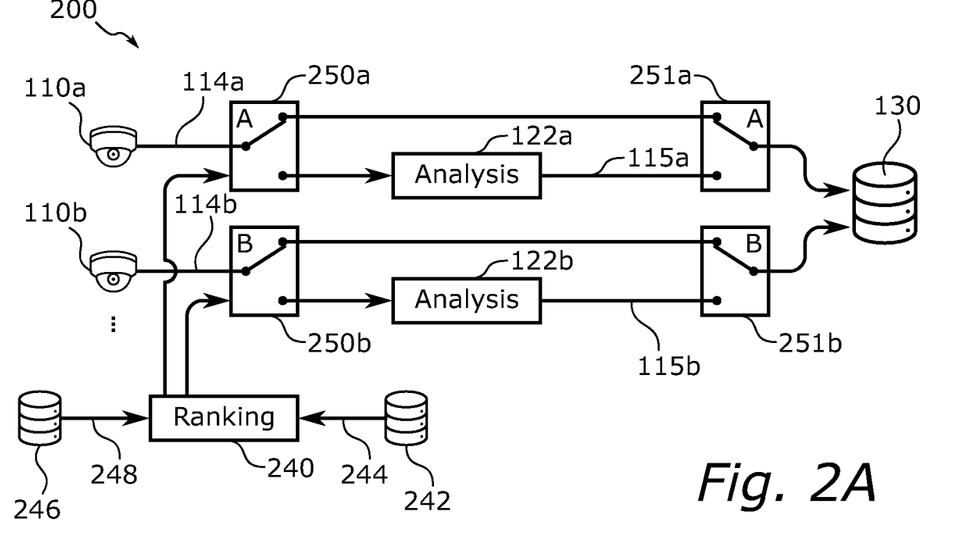
FIG. 2A shows a functional block diagram schematically illustrating an embodiment of a method performed in a video processing and/or management system according to the present disclosure.
Figure 2B:
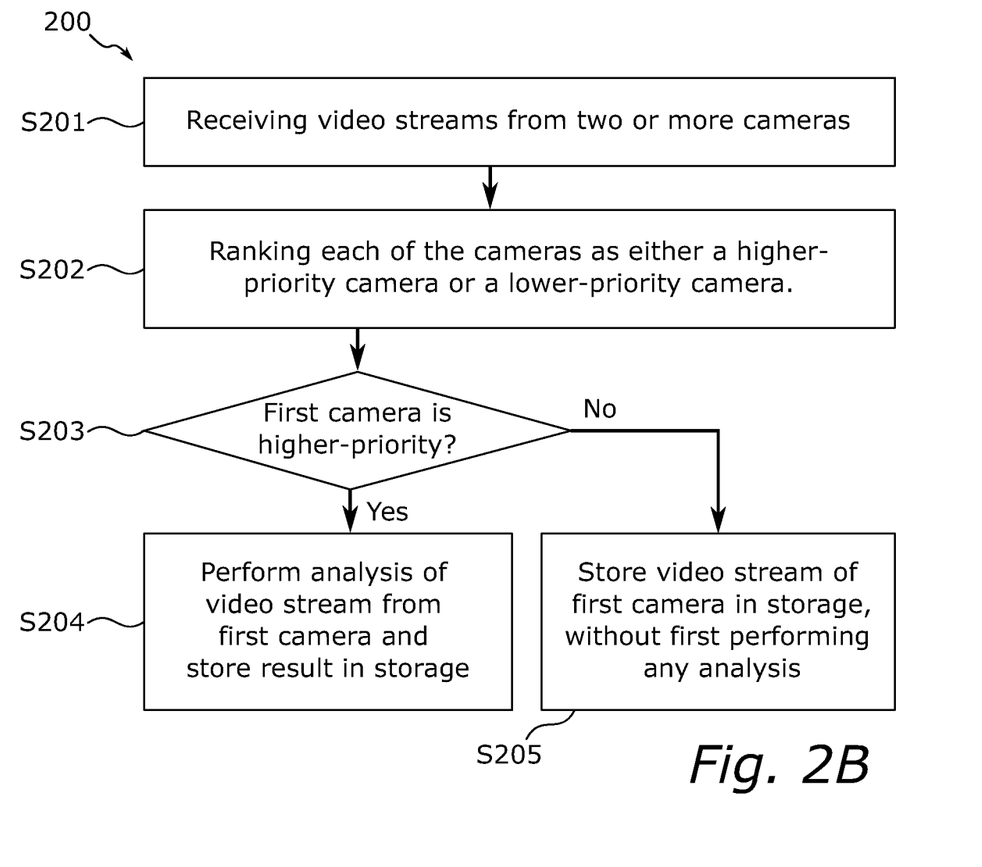
FIG. 2B schematically illustrates a flowchart of an embodiment of a method according to the present disclosure, and FIGS. 3A and 3B schematically illustrates various embodiments of a video processing and/or management system according to the present disclosure.

FIG. 2A shows a functional block diagram of various embodiments of a method 200 of prioritization of video processing resources in a video processing and/or management system (e.g., in a VMS 120 and camera monitoring system 100 as illustrated in FIG. 1A). FIG. 2B schematically illustrates a flowchart of such an envisaged method 200.

In the method 200 (in a first step S201), two or more video streams 114*a* and 114*b* are received from (and captured by) two or more cameras 110*a* and 110*b*. Although only two such cameras and video streams are illustrated in FIG. 2A, it is of course envisaged that there may also be more than two cameras, and that there may thus be one or more additional video streams also received from the cameras in addition to the video streams 114*a* and 114*b*.

Each camera 110*a* and 110*b* may for example be configured to capture a different part of a same scene, or the cameras 110*a* and 110*b* may e.g., be arranged such that they each capture different scenes. For example, one scene may be of an interior of a parking garage, another scene may be of an entrance/exit to/from the parking garage, while a third scene (if using more than two cameras) may be of a roof of the parking garage, or similar. Other examples may include e.g., using one camera to capture one area of an inside of a convenience store, to use another camera to capture another area of the inside of the convenience store, or similar. Most importantly, the exact number of cameras, how they are arranged, and for what purposes they are used is not important, as long as there are multiple cameras potentially each providing at least one video stream to the VMS. The video camera 110*a* may e.g., be referred to as a first camera, the video stream 114*a* may e.g., be referred to as a first video stream, the camera 110*b* may e.g., be referred to as a second camera, the video stream 114*b* may e.g., be referred to as a second video stream, and so on and so forth.

Instead of, as in the conventional method 121 described earlier herein with reference to FIG. 1B, just deciding in advance which cameras that are to be "disabled" or "enabled" in terms of postprocessing, the envisaged method 200 implements a ranking module 240 which ranks (in a second step S202) each of the two cameras 110*a* and 110*b* as either a higher-priority camera or a lower-priority camera. If the first camera 110*a* is ranked as a higher-priority camera (as checked in a third step S203), the first video stream 114*a* may be routed to a first analysis module 122*a* in order to perform video content analysis of the first video stream 114*a*, and a first result 115*a* of such video content analysis (including also e.g., the first video stream 114*a*) may then be further routed to, and stored in, storage 130 (in a fourth step S204). If the first camera 110*b* is instead ranked as a lower-priority camera (as checked in the third step S203), the first video stream 114*a* may instead be routed directly to, and stored in, storage 130, without first performing any video content analysis of the first video stream 114*a* (in a fifth step S205). Here, "without first" is to be interpreted as not performing any video content analysis of the first video stream 114*a* in connection with the ranking and receiving of the first video stream 114*a*. As described earlier herein, video content analysis of the first video stream 114*a* may of course however be performed at a later time, i.e., "on-demand" and in response to receiving a search query from a user, but then only after first receiving the first video stream 114*b* from storage 130. As used herein, if video content analysis is performed on a video stream when the video stream arrives from the camera, and not "on-demand" and in response to receiving a later search query from the user 117, such video content analysis is defined as being performed on a "live video stream". Similarly, when the video content analysis is performed on a video stream retrieved from storage, in response to having received a search query from the user 117, such video content analysis is defined as being performed on a "recorded video stream".

Consequently, the proposed ranking of cameras as envisaged herein is made to decide which video streams that should be analyzed "live" or not. As used herein, the term "live" does of course also include situations in which there is some delay between receiving and processing/analyzing the video stream (due to e.g., various signal processing delays introduced by hardware and/or software), but excludes situations wherein the video stream is analyzed only after, and in response to, first receiving the search query from the user 117.

The above routing options are illustrated by first switches 250*a* and 251*a*, which are controlled by the ranking module 240. For example, if the ranking module 240 decides that the first camera 110*a* is a lower-priority camera, the positions of the first switches 250*a* and 251*a* may be set as already indicated in FIG. 2A. If the ranking module 240 instead decides that the first camera 110*a* is a higher-priority camera, the positions of the first switches 250*a* and 251*a* may be set the opposite of how they are indicated in FIG. 2A.

Similar routing may of course also be performed for the second camera 110*b* and second video stream 114*b* using second switches 250*b* and 251*b*. If the ranking module 240 determines that the second camera 110*b* is a higher-priority camera, the second video stream 114*b* may be routed via a second analysis module 122*b*, and a second result 115*b* of such video content analysis (including also e.g., the second video stream 114*b* itself) may be routed to, and stored in, storage 130. Likewise, if the ranking module 240 instead determines that the second camera 110*b* is a lower-priority camera, the second video stream 114*b* may be routed directly to, and stored in, storage 130 without first, or in connection with, performing the video content analysis. In some embodiments as envisaged herein, some or all of the analysis modules (such as the modules 122*a* and 122*b*) may of course also be implemented as part of a same analysis module.

It will now be described in more detail how, in one or more embodiments of the method 200, the ranking module 240 performs the ranking of a particular camera. As envisaged herein, the ranking of a particular camera is performed using one (or at least one) of three options.

A first option includes that the ranking module 240 obtains an indication of a historical usability of video content captured by the particular camera. A "historical usability" may for example be based on a number of, or frequency of, incident reports having been filed based on video content provided by the particular camera during a historical time interval. For example, if an operator watches video content from a camera (using e.g., a VMS) and notices that an event of interest (such as a trespassing, a theft/burglary, an assault, a fire, or similar) has occurred, the operator may file an incident report indicating what the operator has seen, by which camera the incident was captured, and e.g., when the incident occurred. Such reports may be stored in e.g., an incident database 242, and obtaining a historical usability may correspond to counting a number of such incident reports stored in the database 242 for the particular camera which is to be ranked, and/or e.g., determining how often such incident reports have been filed during a particular historical time span (i.e., an incidence/frequency of events). The number (or frequency) of such incident reports may e.g., be returned as a result 244 of a query made to the database 242. The database 242 may e.g., contain the incident reports themselves, or only statistics about the number/frequency of filed incident reports for each camera.

In some embodiments, it may also be envisaged that a camera on its own is capable of detecting such events of interest, and to file an incident report automatically such that the incident report (or at least statistics thereof) is stored in the database 242. In some embodiments, it is envisaged that events of interest are instead, or in addition, detected as a result of the video content analysis performed in e.g., any of the modules 122a and 122b, and that corresponding incident reports are filed and stored in the database 242.

It is envisaged herein that the number (or frequency) of incident reports filed and stored for a particular camera can serve as a measure of the usability of the camera. If there is a larger number (or higher frequency) of incident reports filed and stored for e.g., the first camera 110a, it can be assumed that this camera is situated in an area where events of interest are more statistically likely to occur. It can therefore be advantageous to rank the first camera 110a as a higher-priority camera, and to assume that a subsequent search for a particular event of interest may be more likely to involve video content captured by the first camera 110a. By having ranked the first camera 110a as a higher-priority camera, the video content analysis of the video content from the first camera 110a would thus already have been performed, and the results thereof would already have been stored in storage 130. Consequently, once the search query from the user 117 arrives, the search query can be processed quicker as no "on-demand" processing of the video stream 114a would first be needed.

Likewise, for a camera for which there are no, or few, incident reports filed, it can be assumed that such a camera is situated in an area where nothing much of interest happens (i.e., where events of interest are statistically less likely to occur). By ranking such a camera as a lower-priority camera, the risk of spending computational resources on analyzing video content captured by this camera without finding anything useful would be reduced or eliminated. Instead, such video content analysis may be performed on-demand once a search query specifically relevant to the camera in question arrives from the user 117.

If the historical usability is defined as a number (e.g., a number or frequency of found incident reports for a camera), deciding whether a historical usability of a particular camera is sufficient to rank the camera as a higher-priority camera may e.g., include checking whether the historical usability exceeds a usability threshold. If the historical usability exceeds the usability threshold, the camera can be ranked as a higher-priority camera, and otherwise be ranked as a lower-priority camera.

A second option includes that the ranking module 240 obtains an indication of a historical cost in terms of processing resources needed for performing video content analysis of video content captured by the particular camera. A "historical cost" (in terms of processing resources) may e.g., be a number (or frequency) of object tracks made by the particular camera. The number (or frequency) of such object tracks may be counted within a historical time interval as defined earlier herein. An "object track" may e.g., be defined as each time a movement of an object is detected and tracked in the scene.

Object tracks for each camera may e.g., be stored in an objects track database 246, and a number (or frequency) of such object tracks for the particular camera may be obtained as a result 248 of a query made to the database 246. In some embodiments, the database 246 may include the object tracks themselves (i.e., data defining a path taken by an object in the scene), or only statistics about the number/frequency of such tracks for each camera. The databases 242 and 246 may of course also be provided as a same database, and/or even as part of e.g., storage 130.

If the cameras 110a and 110b are themselves capable of tracking objects, the tracking may be performed by the cameras 110a and 110b and be reported to the database 246. Object tracks may e.g., be provided as metadata part of the video streams generated by the cameras. In other embodiments, tracking may e.g., be performed as part of the video content analysis (when/if performed), and then be reported/stored in the database 246.

It is envisaged herein that the number (or frequency) of object tracks obtained for (or by) a particular camera can serve as a measure of how much video processing resources that will, on average, be needed if processing the video stream generated by the particular camera. This because if there are many object tracks generated for a particular camera, a video stream from the particular camera will likely require more video processing resources, and vice versa. If the amount of available video processing resources is limited, it is therefore envisaged herein to rank a camera as a lower-priority camera if the historical cost is higher, and to rank a camera as a higher-priority camera if the historical cost is lower. By so doing, the available video processing resources may e.g., be used to directly process and analyze video streams from a larger number of cameras.

If the historical cost is defined as a number (e.g., a number or frequency of object tracks for/by a camera), deciding whether a historical cost of a particular camera is low enough to rank the camera as a higher-priority camera may e.g., include checking whether the historical cost is below a cost threshold. If the historical cost is below the cost threshold, the camera can be ranked as a higher-priority camera, and otherwise be ranked as a lower-priority camera.

As a third option, the first option and the second option may be combined to obtain a measure indicative of a usability versus cost for a particular camera. For example, the particular camera can be ranked as a higher-priority camera if the historical usability outweighs the historical cost of the camera by more than a certain amount, and otherwise be ranked as a lower-priority camera. If e.g., defining the historical usability as a parameter U, and the historical cost as a parameter C, a usability-to-cost ratio R may e.g., be calculated as $R=U/C$, $R=U^2/C^2$, or as any other suitable fraction of a function of the usability and a function of the cost. Whether the historical usability outweighs the historical cost by more than a certain amount may e.g., be determined by checking whether R exceeds a usability-to-cost threshold (value).

As envisaged herein, the various thresholds (e.g., the usability threshold, the cost threshold, and/or the usability-to-cost threshold) may be static, or changed dynamically based on e.g., a currently available amount of video processing resources. For example, the historical usability of each camera could be obtained, and the ranking of the cameras could be performed by ordering the cameras according to their historical usability, and to then rank the cameras having the highest historical usability scores as higher-priority cameras, and rank the other cameras as lower-priority cameras. The usability score of the camera having the highest usability score, but which is still ranked as a lower-priority camera, may e.g., serve as the usability threshold.

As another example, the historical cost of each camera could be obtained, and the cameras could be ordered according to their historical cost. The cameras having the lowest historical cost scores could be ranked as higher-priority cameras, and the other cameras as lower-priority cameras.

The historical cost score of the camera having the lowest historical cost score, but which is still ranked as a lower-priority camera, may e.g., serve as the cost threshold.

As yet another example, all cameras could also be ordered according to their usability-to-cost scores, and the cameras having the highest usability-to-cost scores can be ranked as higher-priority cameras, and the other cameras a lower-priority cameras. The usability-to-cost score of the camera having the highest usability-to-cost score, but which is still ranked as a lower-priority camera, may e.g., serve as the usability-to-cost threshold.

Another way of illustrating non-static thresholds is as follows. It may be assumed that there are at least the two video streams 114a and 114b received from the at least two cameras 110a and 110b, respectively. The ranking of a camera may then include e.g., using the historical usability of video content captured by the second camera 110b to define the usability threshold, e.g., by setting the usability threshold equal to the historical usability (score) $U_2$ of the second camera 110b. For the first camera 110a to be ranked as a higher-priority camera, it's historical usability (score) $U_1$ should then need to exceed that of the second camera 110b (i.e., such that $U_1 > U_2$). The ranking of a camera may e.g., also, or in addition, include using the historical cost in terms of processing resources needed for performing video content analysis of video content captured by the second camera 110b to define the cost threshold, e.g., by setting the cost threshold equal to the historical cost (score) $C_2$ of the second camera 110b. For the first camera 110a to be ranked as a higher-priority camera, its historical cost (score) $C_1$ should then be below that of the second camera 110b (i.e., such that $C_1 < C_2$). Finally, the ranking of a camera could also include using how much the historical usability of the second camera 110b outweighs the historical cost of the second camera 110b to define the particular amount with which the historical usability of the first camera 110a needs to outweigh the historical cost of the first camera 110a for the first camera 110a to be ranked as a higher-priority camera. For example, if the usability-to-cost ratio for the second camera 110b is $R_2 = U_2/C_2$, the usability-to-cost ratio $R_1 = U_1/C_1$ for the first camera 110a should be larger than that of the second camera 110b in order for the first camera 110a to be ranked as a higher priority camera (i.e., such that $R_1 > R_2$).

Exactly how many cameras that are selected as higher-priority or lower-priority cameras may depend on an available amount of video processing resources. For example, one or more of the usability thresholds, the cost threshold and the certain amount which the usability needs to exceed the cost (e.g., the usability-to-cost threshold) may be dynamically adjusted based on a currently available amount of video processing resources. For example, if it is decided that this amount is higher, the various thresholds may be lowered such that more video streams are processed "live". Likewise, if it is decided that this amount is lower, the various thresholds may be increased such that fewer video streams are processed "live".

As used herein, a "historical time interval" for which the number (or frequency) of e.g., filed incident reports and/or object tracks are counted may e.g., correspond to one or more hours, days, weeks, months, or longer. The length of the historical time interval may be fixed, or be changed dynamically. The historical time interval may also not necessarily be continuous, but instead include e.g., only all same hours (e.g., only during 12:30-13:30) during the last days, all same days (e.g., only Mondays) during the last weeks, all same weeks (e.g., only weeks with number 37) during the last years, all same months (e.g., only Octobers) during the last years, or similar. The historical time interval used to evaluate the historical cost may also not necessarily be the same as the historical time interval used to evaluate the historical usability.

It may be envisaged that e.g., a historical cost of a camera may be subjected to seasonal change, daily change, or similar. A number of false detections/tracks of objects may e.g., increase during winter due to snowing, or due to other seasonal weather phenomena, and/or e.g., be different on weekdays versus weekends, and/or e.g., be different during daytime versus nighttime, etc. If for example evaluating the historical cost on a Monday, it may be envisaged to then gather statistics only for past Mondays, and to exclude statistics available for other days of the week. For example, if evaluating the historical cost on a Monday, statistics may be gathered for e.g., the previous 20 Mondays, or similar. As another example, if evaluating the historical cost on a weekend, it may be envisaged that statistics are gathered for a number of previous weekends, and that statistics for e.g., previous weekdays are excluded.

With regards to the historical usability of a camera, it is envisaged that also this measure may be subject to daily or seasonal change. For example, it may be such that a frequency of burglaries, assaults, or similar, is higher during summer than during winter. It may e.g., also be such that a frequency of accidents is higher during winter than during summer, or similar, due to e.g., more unfavorable winter weather conditions. Phrased differently, the number/frequency of particular events of interest may not be constant throughout e.g., a same year.

Finally, it may be expected that, within a particular time interval, the number/frequency of object tracks may be higher than the number/frequency of occurred events of interest. It may for example be assumed that not all persons moving across a scene (each generating an object track) will also be persons of interest, or similar. The statistical data available for determining how to rank cameras based on their historical usability may therefore be scarcer than the data available for determining their historical cost. It may therefore e.g., be envisaged that the historical time interval used to determine historical usability extends further back in time than the historical time interval used to determine historical cost. Such adaptation of the respective historical time intervals may of e.g., be made automatically.

As discussed earlier herein, it is envisaged that a user 117 may search for particular events and/or objects of interest. This may be performed by the user 117 sending a search request relating to a particular object and/or event of interest to the video processing and/or management system. The method 200 may include to first check whether there are results of video content analyses of one or more video streams from one or more cameras already stored in storage 130, and then use these results to check whether the particular object and/or event of interest was captured by the one or more video streams (which may also be stored in storage 130). If the outcome is positive, the relevant parts of (or the whole of) the corresponding video stream(s) may then be sent to the user. For example, the method 200 may include determining that a result 115a of a performed video content analysis of the first video stream 114a from the first camera 110a is stored in storage 130. The method 200 may then check whether the stored result 115a indicates the particular object and/or event of interest. If affirmative, the method 200 may finally send the result 115a of the video content analysis and/or at least the relevant part(s) of the first video stream 114a to the user 117. As described earlier herein, the relevant part(s) of the first video stream 114a may for example also be stored in storage 130, or e.g., be stored in the first camera 110a or somewhere else accessible by the video processing and/or management system.

The present disclosure also envisages a video processing and/or management system configured to perform a method as described above, as will now be described in more detail with further reference also to FIGS. 3A and 3B. When describing FIGS. 3A and 3B, the terms "video processing and/or management system" and simply "system" will be used interchangeably.

Figure 3A:
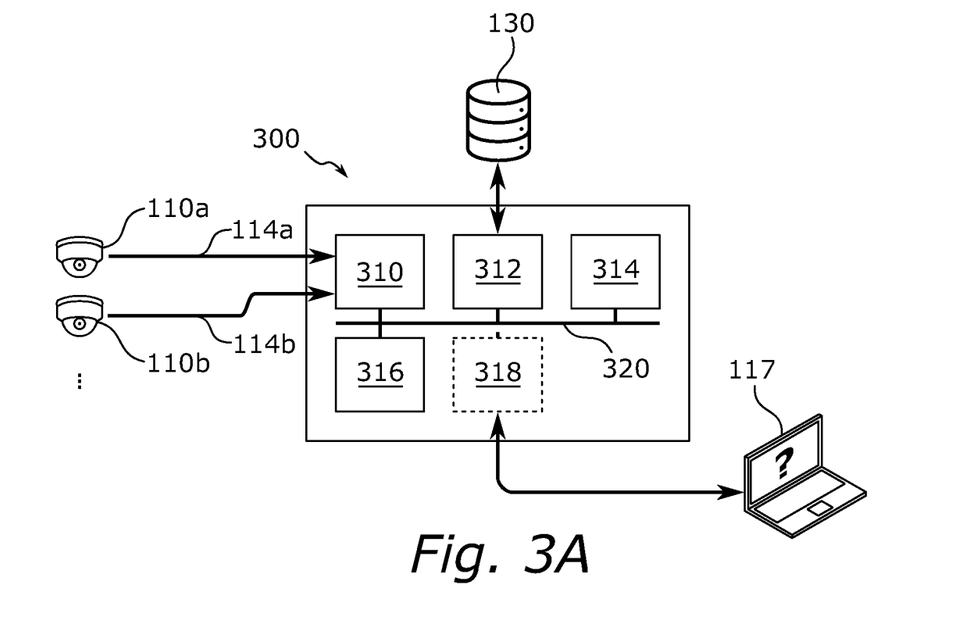

FIG. 3A schematically illustrates an embodiment of a system 300. The system 300 includes an interface 310. The interface 310 is configured for receiving at least two or more video streams (such as video streams 114a and 114b) captured by two or more cameras (such as cameras 110a and 110b). The interface 310 may for example be a wired connection (supporting e.g., Ethernet as defined in for example IEEE 802.3 or subsequent standards), and/or be a wireless connection (supporting e.g., Wi-Fi as defined in for example IEEE 802.11 or subsequent standards). Other types of interfaces are also envisaged, as long as the interface 310 enables the system 300 to at least receive video streams from the two or more cameras.

The system 300 further includes an additional interface 312 configured for exchanging data with a storage (such as storage 130). The exact configuration of the interface 312 may depend on what type of storage that is to be used. In some embodiments, the storage (such as storage 130) may also form part of the system 300. The storage 130 preferably includes, or is, a computer readable non-transitory storage medium, for example in form of non-volatile computer memory such as a hard disk drive (HDD), a solid-state drive (SSD), a secure digital (SD) card, a USB flash drive, or similar such as any combination of magnetic memory, optical memory, solid-state memory, or even remotely mounted memory. Other types of computer readable storage mediums are also envisaged, as long as their functionality allows to store video streams and/or results of video content analysis of such video streams.

The system 300 also includes a processor 314 and a memory 316. As envisaged herein, the processor (or "processing unit/circuitry") 314 may for example be any combination of one or more of a suitable central processing unit (CPU), multiprocessor, microcontroller (µC), digital signal processor (DSP), graphics processing unit (GPU), application specific integrated circuit (ASIC), field-programmable gate-array (FPGA), etc., capable of executing software instructions stored in the memory 316. As used herein, a memory may e.g., be any combination of random-access memory (RAM) and read only memory (ROM), or any other memory in which instructions for the processor 314 may be stored. The memory 316 contains (i.e., stores) instructions that, when executed by the processor 314, causes the system 300 to perform e.g., any of the embodiments of methods 200 disclosed earlier herein. Briefly summarized, the system 300 is such that the instructions stored in the memory 316, when executed by the processor 314, causes the system 300 to receive the two or more video streams 114a and 114b from the cameras 110a and 110b, to rank each of the two or more cameras 110a and 110b as described earlier herein, and to then either perform the video content analysis of the video streams from cameras ranked as higher-priority cameras and store the result thereof in storage 130, or to store the video streams from cameras ranked as lower-priority cameras directly in storage 130 without first performing such video content analysis.

The system 300 may also include one or more further interfaces 318, such that e.g., a user 117 may connect to the system 300 in order to post search queries, receive video streams from storage 130, or similar. It may of course be envisaged that such communication between the user 117 and the system 300 may instead take place over e.g., the interface 310, in which case the additional interface(s) 318 may be optional. A communication bus 320 may for example be provided to interconnect the various parts 310, 312, 314, 316 and 318, such that these parts may communicate with each other as required to obtain a desired functionality. The system 300 may of course also include one or more other components needed for performing other tasks of the system 300, such as e.g., receiving, decoding/encoding, and transferring the incoming video streams, and similar. It may also be envisaged that e.g., the processor 314 can also handle at least some of these additional tasks.

Figure 3B:
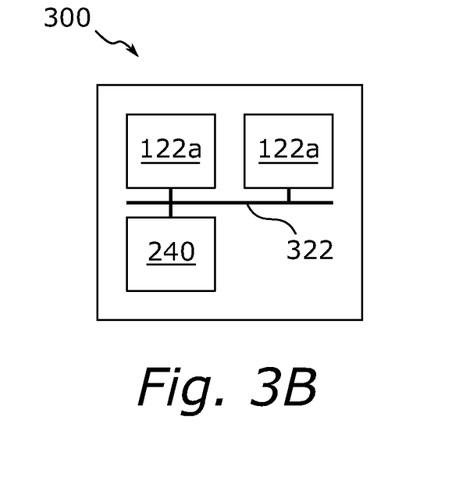

FIG. 3B schematically illustrates an embodiment of the system 300 as described with reference to FIG. 3A, but represented as a collection of functional blocks corresponding e.g., to those discussed with reference to FIG. 2A. The system 300 includes e.g., the analysis modules 122a and 122b, and the ranking module 240. If there are more than two cameras connectable to the system 300, the system 300 may of course also include additional analysis modules, such that there is e.g., one analysis module available for each camera. One or more or all of the modules 122a, 122b and 240 may for example be implemented in software only, in hardware only, and/or as a combination of hardware and software. Such software may for example be provided by the instructions stored in the memory 316. Each module may be provided as a separate entity, or two or more or all of the modules may be provided as forming part of a same, single entity. A communication bus 322 for inter-module communication may be provided, either physically, implemented in software, or both.

In addition to the system 300, the present disclosure also envisages a camera monitoring system 100 such as illustrated in FIG. 1A, wherein the system 120 is modified, or even replaced with the system 300 described with reference to FIGS. 3A and 3B, such that it can perform embodiment of the improved method 200 for prioritization of video processing resources as described e.g., with reference to FIGS. 2A and 2B.

Envisaged herein is also to provide one or more computer programs. One such computer program may for example be for performing the method 200 for prioritization of video processing resources as discussed and envisaged herein, for performing such a method in the system 300 described with reference to FIGS. 3A and 3B. A computer program may for example correspond to the instructions stored in the memory 316 of the system 300, such that the corresponding method is performed by the system 300 when the processor (or processing circuitry) 314 executes the instructions. In other envisaged embodiments, the computer programs may be in a form not yet readable and executable by the processor 314, but rather be provided as e.g., text specified according to a programming language, which text needs to be compiled to a format readable by the processor 314, e.g., by using a therefor suitable compiler. The compiler may of course be executed by the processor 314 itself, or even form part of the processor 314 itself for real-time compilation.

Envisaged herein is also to provide one or more computer program products. Each such computer program product includes a computer readable storage medium on which one or more of the above-mentioned computer programs are stored. For example, one computer program product may include the computer program for performing the envisaged method 200 for prioritization of video processing resources as disclosed and discussed herein. A (computer-readable) storage medium (e.g., a "memory") may be non-transitory and such as already defined herein when describing the storage 130 shown in FIG. 3A. In some other embodiments, the computer readable storage medium may be transitory (e.g., an electric signal readable by the processor). Other types of computer readable storage mediums are also envisaged, as long as their functionality allows to store the computer program such that they are readable by the processor 314 and/or by an intermediate compiler.

In summary of the various embodiments presented herein, the present disclosure provides an improved way for prioritization of video processing resources in a video processing and/or management system. By automatically ranking cameras as higher-priority or lower-priority cameras based on their historical usability, historical cost, and/or based on their historical usability-to-cost ratio, the envisaged solution enables a more optimal use of the limited resources normally available for processing and analysis of video streams in such a system. In particular, the envisaged solution dynamically may also dynamically adapt such ranking of the cameras with time. That is, a camera is not permanently ranked as being either a higher- or lower-priority camera, but the ranking may change if e.g., a previously busy area of the scene becomes less busy, or similar. By directly performing the video content analysis of the video streams of higher-priority cameras, the processing of search queries submitted by a user may be speed up. This because, by using the envisaged ranking of the cameras, the probability of already having performed and stored the results of video content analysis for the video streams which will turn out to be relevant for the search query is increased.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS 100 camera monitoring system
110a-d cameras
111, 112 first and second sets of cameras
114a-d video streams
115a, 115b, 116 results of video content analyses
117 user (terminal)
118 search query
120, 300 video processing and/or management system
121 conventional method
122a, 122b video content analysis modules
130 storage
200 improved method
S201-S205 method steps
240 camera ranking module
242 incident database
244 result of incidents query
246 object tracks database
248 result of object tracks query
250a-b, 251a-b switches
310 camera interface
312 storage interface
314 processor
316 memory
318 user interface
320, 322 communication bus(es)

The invention claimed is:

1. A method for prioritization of video processing resources in a video processing and/or management system, the method comprising:
receiving two or more video streams captured by two or more cameras, including receiving at least a first video stream captured by a first camera;
ranking each of the two or more cameras as either a higher-priority camera or a lower-priority camera;
if ranking the first camera as a higher-priority camera, performing video content analysis of the first video stream and storing a result of the performed video content analysis in storage, and
if ranking the first camera as a lower-priority camera, storing the first video stream in storage without first, or in connection therewith, performing such video content analysis,
wherein said ranking of a camera includes one of:
i) obtaining an indication of a historical usability of video content captured by the camera, and ranking the camera as a higher-priority camera if the historical usability exceeds a usability threshold and otherwise as a lower-priority camera;
ii) obtaining an indication of a historical cost in terms of processing resources needed for performing video content analysis of video content captured by the camera, and ranking the camera as a higher-priority camera if the historical cost is below a cost threshold and otherwise as a lower-priority camera, wherein the cost threshold is dynamically updated based on a current amount of video processing resources available for video content analysis in the video processing and/or management system; and
iii) ranking the camera as a higher-priority camera if the historical usability outweighs the historical cost of the camera by more than a certain amount and otherwise as a lower-priority camera.

2. The method according to claim 1, wherein the historical usability of a camera includes a number or frequency of incident reports generated based on the video content captured by the camera.

3. The method according to claim 1, wherein the historical cost of a camera includes a number or frequency of object tracks based on the video content captured by the camera.

4. The method according to claim 3, wherein the number or frequency of object tracks based on the video content captured by a camera is obtained by the video processing and/or management system from the camera.

5. The method according to claim 1, wherein the video content analysis is performed as a background process in the video processing and/or management system.

6. The method according to claim 1, wherein one or more of the usability threshold and the certain amount which the historical usability needs to outweigh the historical cost is dynamically updated based on a current amount of video processing resources available for video content analysis in the video processing and/or management system.

7. The method according to claim 1, further comprising:
receiving a search request from a user relating to one or more of a particular object of interest and particular event of interest, and
delivering a result of a performed video content analysis of the first video stream to the user,
including determining whether the first camera used to capture the first video stream was ranked as a higher-priority camera or a lower-priority camera and, if it is determined that the first camera was ranked as a higher-priority camera, obtaining the result of the performed video content analysis from storage or, if it is determined that the first camera was ranked as a lower-priority camera, obtaining the first video stream from storage and obtaining the result of the video content analysis by performing the video content analysis of the first video stream upon receiving the search request from the user.

8. The method according to claim 1, wherein the first video stream is received directly from the first camera.

9. The method according to claim 1, further includes performing the ranking of each of the two or more cameras in response to determining that an amount of video processing resources available for video content analysis in the video processing and/or management system is below a first resource threshold.

10. A video processing and/or management system, the system comprising:
an interface for receiving two or more video streams captured by two or more cameras;
an interface for exchanging data with a storage;
a processor, and
a memory storing instructions that, when executed by the processor, cause the system to:
receive the two or more video streams captured by the two or more cameras, including receiving at least a first video stream captured by a first camera;
rank each of the two or more cameras as either a higher-priority camera or a lower-priority camera;
if ranking the first camera as a higher-priority camera, perform video content analysis of the first video stream and to store a result of the performed video content analysis in storage, and
if ranking the first camera as a lower-priority camera, store the first video stream in storage without first, or in connection therewith, performing such video content analysis,
wherein said ranking of a camera includes one of:
i) to obtain an indication of a historical usability of video content captured by the camera, and to rank the camera as a higher-priority camera if the historical usability exceeds a usability threshold and otherwise as a lower-priority camera;
ii) to obtain an indication of a historical cost in terms of processing resources needed for performing video content analysis of video content captured by the camera, and to rank the camera as a higher-priority camera if the historical cost is below a cost threshold and otherwise as a lower-priority camera, wherein the cost threshold is dynamically updated based on a current amount of video processing resources available for video content analysis in the video processing and/or management system; and
iii) to rank the camera as a higher-priority camera if the historical usability outweighs the historical cost of the camera by more than a certain amount and otherwise as a lower-priority camera.

11. A monitoring camera system, comprising:
two or more cameras each configured to capture a video stream;
a storage, and
a video processing and/or management system, configured to receive the two or more video streams from the two or more cameras, and to exchange data with the storage, the system comprising:
an interface for receiving two or more video streams captured by two or more cameras;
an interface for exchanging data with a storage;
a processor, and
a memory storing instructions that, when executed by the processor, cause the system to:
receive the two or more video streams captured by the two or more cameras, including receiving at least a first video stream captured by a first camera;
rank each of the two or more cameras as either a higher-priority camera or a lower-priority camera;
if ranking the first camera as a higher-priority camera, perform video content analysis of the first video stream and to store a result of the performed video content analysis in storage, and
if ranking the first camera as a lower-priority camera, store the first video stream in storage without first, or in connection therewith, performing such video content analysis,
wherein said ranking of a camera includes one of:
i) to obtain an indication of a historical usability of video content captured by the camera, and to rank the camera as a higher-priority camera if the historical usability exceeds a usability threshold and otherwise as a lower-priority camera;
ii) to obtain an indication of a historical cost in terms of processing resources needed for performing video content analysis of video content captured by the camera, and to rank the camera as a higher-priority camera if the historical cost is below a cost threshold and otherwise as a lower-priority camera, wherein the cost threshold is dynamically updated based on a current amount of video processing resources available for video content analysis in the video processing and/or management system; and
iii) to rank the camera as a higher-priority camera if the historical usability outweighs the historical cost of the camera by more than a certain amount and otherwise as a lower-priority camera.

12. A non-transitory computer readable storage medium storing a computer program for prioritization of video processing resources, configured to cause, when executed by a processor of a video processing and/or management system, cause the system to:
receive two or more video streams captured by two or more cameras, including receiving at least a first video stream captured by a first camera;
rank each of the two or more cameras as either a higher-priority camera or a lower-priority camera;
if ranking the first camera as a higher-priority camera, perform video content analysis of the first video stream and to store a result of the performed video content analysis in storage, and
if ranking the first camera as a lower-priority camera, store the first video stream in storage without first, or in connection therewith, performing such video content analysis, wherein said ranking of a camera includes one of:
i) to obtain an indication of a historical usability of video content captured by the camera, and to rank the camera as a higher-priority camera if the historical usability exceeds a usability threshold and otherwise as a lower-priority camera;
ii) to obtain an indication of a historical cost in terms of processing resources needed for performing video content analysis of video content captured by the camera, and to rank the camera as a higher-priority camera if the historical cost is below a cost threshold and otherwise as a lower-priority camera, wherein the cost threshold is dynamically updated based on a current amount of video processing resources available for video content analysis in the video processing and/or management system; and
iii) to rank the camera as a higher-priority camera if the historical usability outweighs the historical cost of the camera by more than a certain amount and otherwise as a lower-priority camera.

* * * * *